(No Model.)
S. P. STODDARD.
PICTURE FRAME.
No. 452,925. Patented May 26, 1891.
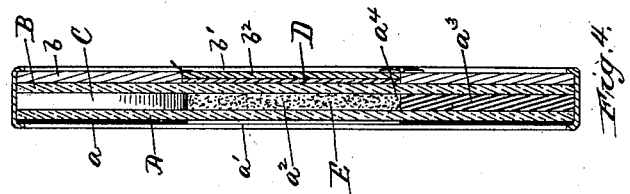
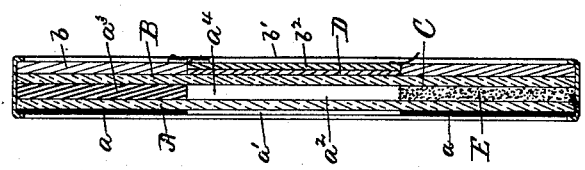
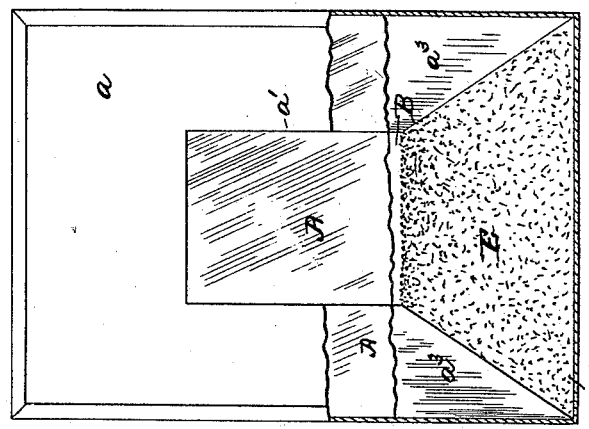
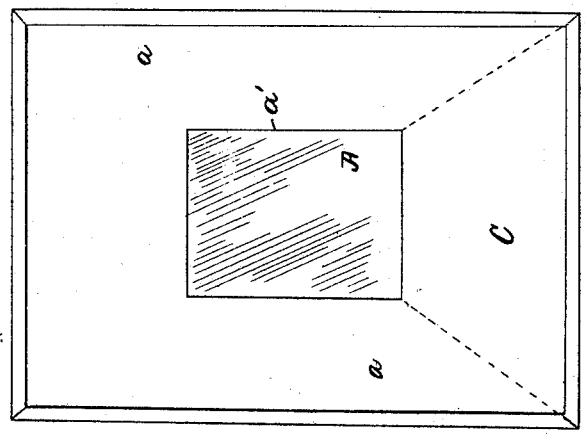
Attest:
C. W. Benjamin
A. J. Fales.
Inventor:
Salomon P. Stoddard
By Arden J. Fitch
His Atty.

UNITED STATES PATENT OFFICE.

SOLOMON P. STODDARD, OF BROOKVILLE, INDIANA.

PICTURE-FRAME.

SPECIFICATION forming part of Letters Patent No. 452,925, dated May 26, 1891.

Application filed November 22, 1890. Serial No. 372,295. (No model.)

*To all whom it may concern:*

Be it known that I, SOLOMON P. STODDARD, of Brookville, county of Franklin, State of Indiana, a citizen of the United States, have invented certain new and useful Improvements in Picture-Frames, of which the following is a full, clear, and exact description, reference being had to the accompanying drawings, forming part of this specification.

My invention relates to a picture-frame, and the object of my invention is to provide a frame for a picture or other similar object adapted to be inserted in the frame, in which frame, by a simple manipulation thereof, the picture or object may be wholly concealed from view and caused to apparently disappear; and my invention consists in a frame the opening or aperture of which through which the picture is visible is glazed with two pieces or plates of glass imposed flatwise upon each other and separated so as to leave a space between the said pieces or plates and inclosed thereby, and said frame being provided with a chamber therein communicating with the space between the glasses in said glazed aperture, together with a back piece adapted to close over and upon the rearward side of said aperture, substantially as and for the purposes hereinafter set forth.

Figure 1 is a front elevation of a picture-frame containing my invention. Fig. 2 is a similar view of the same, showing portions of the frame cut away to reveal its mode of construction. Fig. 3 is a central longitudinal section of the frame on the line $xx$ of Fig. 1, and showing the frame in position to disclose therein a picture inserted in the glazed opening thereof; and Fig. 4 is a similar section of the same, showing the frame when manipulated to the position to effect the concealment therein of the picture.

In constructing my improved picture-frame I preferably use two plates of glass A and B of equal size, and each of a superficial area corresponding to the size of the frame desired. I cover the front plate A with an opaque material—such, for example, as plush, as at $a$—leaving therein an aperture $a'$, desirably about central of the plate-surface. The plates A and B are imposed one upon the other flatwise, and are separated so as to leave a space or chamber $a^2$ between them, which should register or be coextensive with the aperture $a'$. This is desirably accomplished by interposing a sheet of pasteboard $a^3$ between the plates A and B of the same area as said plates, and having an aperture $a^4$ registering with the aperture $a'$. The back of the rearward plate B is preferably covered with an opaque material—as, for example, pasteboard or cloth, as at $b$—and this backing has an aperture $b'$, registering with the aperture $a'$, and is closed by a back piece $b^2$, which is desirably in the form of an opaque plate hinged as a flap to the material $b$, so that it may be readily raised to admit a picture to place beneath it against the glass B in the glazed aperture of the frame, and may be then closed down upon said picture to hold it in place.

The frame is provided with a chamber C, which communicates with the space or chamber $a^2$ between the plates A and B, and this may be readily accomplished by cutting away the board $a^3$, which separates the plates A and B flatwise, as heretofore described, from an edge, preferably the lower edge, of the aperture $a^4$ therein to the edge of the frame itself, as shown in Figs. 1 and 2. The edges of the board $a^3$ where it is cut away to thus constitute the chamber C desirably diverge toward the side edges of the frame, as shown, so as to give an area to the chamber C somewhat greater than that of the chamber or space $a^2$, it being requisite that said chamber C should include a cubic space, which is at least equal to and, as intimated, preferably greater than that of the space or chamber $a^2$.

The materials composing the frame may be varied from those above described without departure from the essential features of my invention, which consist in a frame-piece having a doubly-glazed aperture $a'$ with a space or chamber $a^2$ between the glass plates at said aperture, a chamber C in the frame communicating with the chamber $a^2$, and a back piece or flap $b^2$ to close the glazed frame-aperture.

It is evident that a picture—as, for example, one shown at D, Figs. 3 and 4—placed in the frame at the rear of the glass plate B will be visible through the aperture $a'$ and that the flap $b^2$ will serve to hold the picture in place. It is also evident that the chamber C is adapted to hold or contain a material which possesses the characteristic of readily and quickly moving by gravity from one place or receptacle to another—as, for example, a fluid or a granular substance.

In utilizing my described frame for the purposes hereinbefore stated, in pursuance of my invention, I prefer to employ a granular material—such, for example, as fine sand—and to fill the chamber C therewith, as illustrated at E in the drawings.

Now it is evident that when a picture has been placed in the frame, as above set forth, the frame being held in the position shown in Figs. 1, 2, and 3, with the chamber C, containing the sand, at the lower side of the frame, the sand will remain in the chamber C and the picture be visible through the doubly-glazed aperture $a'$, and that when the frame is manipulated so that its position is reversed to that shown in Fig. 4 the sand or other flowable material in the chamber C will quickly pass into the space or chamber $a^2$, and, filling the same, will obscure or conceal the picture on the side toward the aperture $a'$. By this means the picture may by the described manipulation of the frame and the reverse thereof be caused to instantaneously disappear and reappear at the aperture $a'$. For the purpose of making the illusion perfect, the inner face of the back piece $b^2$ may be colored or tinted the same color as that of the sand or other material used in the said chambers, or such face of the back piece may be coated with an adherent film of the said sand or material.

In performing the illusion it is intended that the manipulator shall hold the frame, first, in the position indicated in Figs. 1, 2, and 3, and raising the flap $b^2$ permit the aperture $a'$ to be seen clearly through, then to place a picture or other suitable object in and filling the glazed aperture, thereafter closing down the flap. Then by turning the frame over endwise to bring the front toward himself the frame will be reversed by the manipulator to the position shown in Fig. 4, permitting the sand or other material to pass from the chamber C by gravity to the chamber, so that when the frame is turned sidewise in this reversed position with its front to the on-looker the picture will be obscured and the inner face of the flap $b^2$ be apparently visible only.

What I claim as my invention, and desire to secure by Letters Patent, is—

1. A picture-frame composed of a frame-piece, a double glazing in the aperture of the frame-piece, the glass plates constituting said glazing being separated flatwise at and throughout the area of the aperture, so as to comprise and inclose thereat a space or chamber, a chamber in the frame-piece communicating with said first chamber, and a back piece adapted to close the frame-aperture at one face thereof, substantially as and for the purpose set forth.

2. A picture-frame composed of a frame-piece, a double glazing in the aperture of the frame-piece, the glass plates constituting said glazing being separated flatwise at and throughout the area of the aperture, so as to comprise and inclose thereat a space or chamber, a chamber in the frame-piece communicating with said first chamber, a material adapted to flow by gravity contained in said chamber in the frame-piece, and a back piece adapted to close the frame-aperture at one face thereof, substantially as and for the purpose specified.

SOLOMON P. STODDARD.

Witnesses:
JOHN F. MCKEE,
LOUDEN T. HALLOWELL.